Oct. 24, 1944.  J. J. GOUGH  2,361,285
ELECTRIC COOKING APPLIANCE
Filed Feb. 17, 1941  3 Sheets-Sheet 1
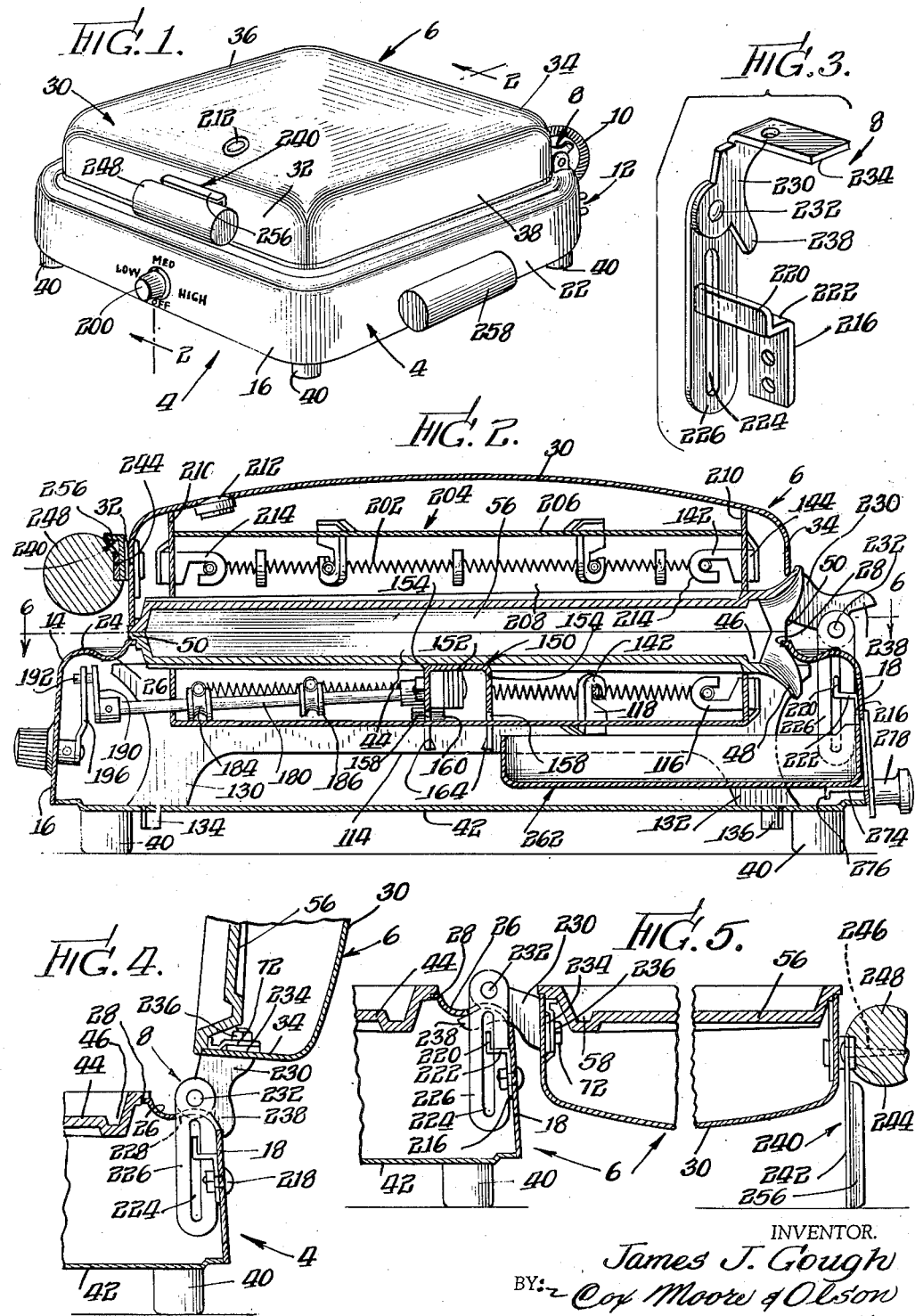
INVENTOR.
James J. Gough
BY: Cox Moore & Olson
attys.

Oct. 24, 1944.  J. J. GOUGH  2,361,285
ELECTRIC COOKING APPLIANCE
Filed Feb. 17, 1941  3 Sheets-Sheet 2
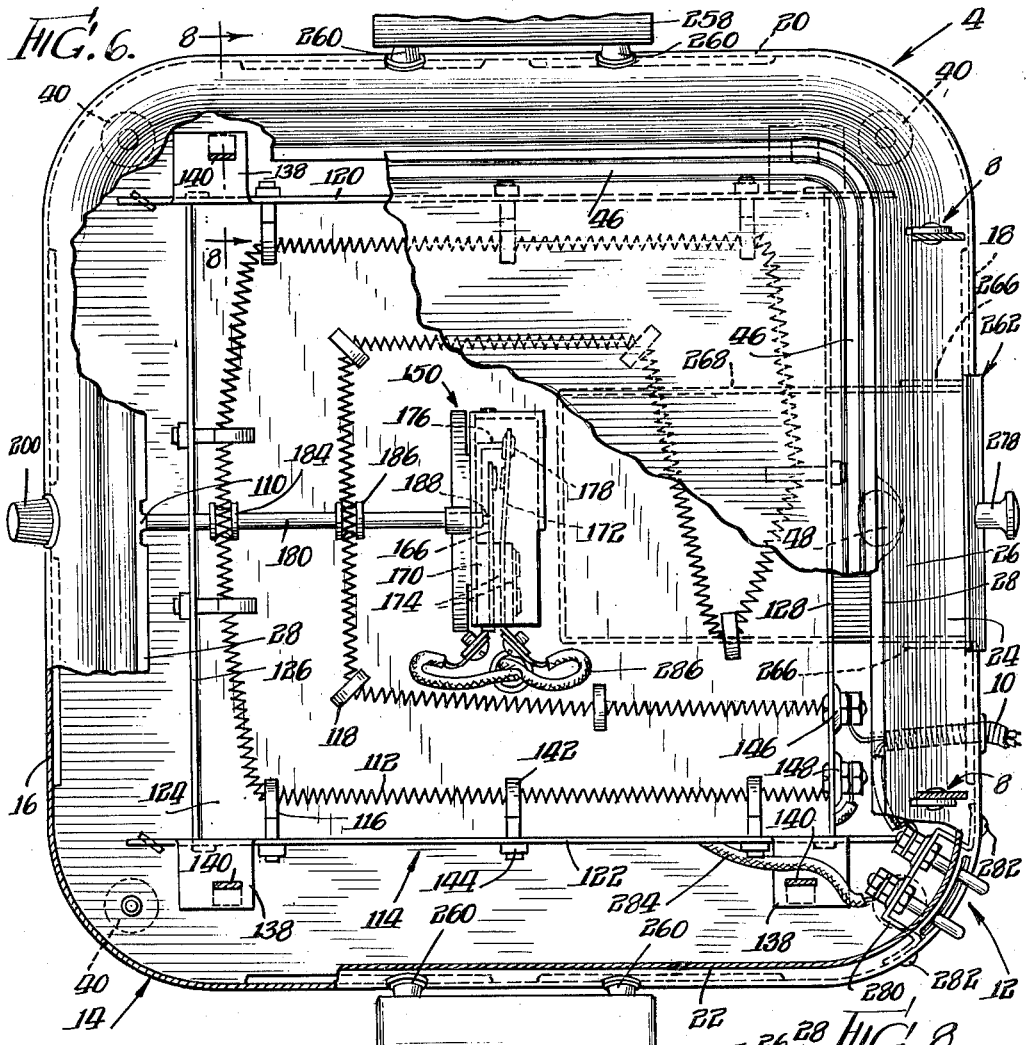
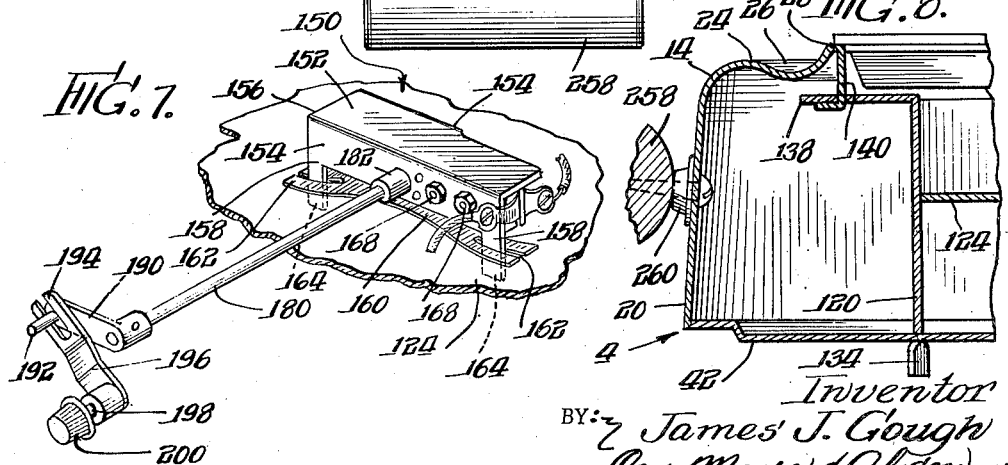
Inventor
James J. Gough
BY Cox, Moore & Olson attys.

Oct. 24, 1944.  J. J. GOUGH  2,361,285
ELECTRIC COOKING APPLIANCE
Filed Feb. 17, 1941  3 Sheets-Sheet 3
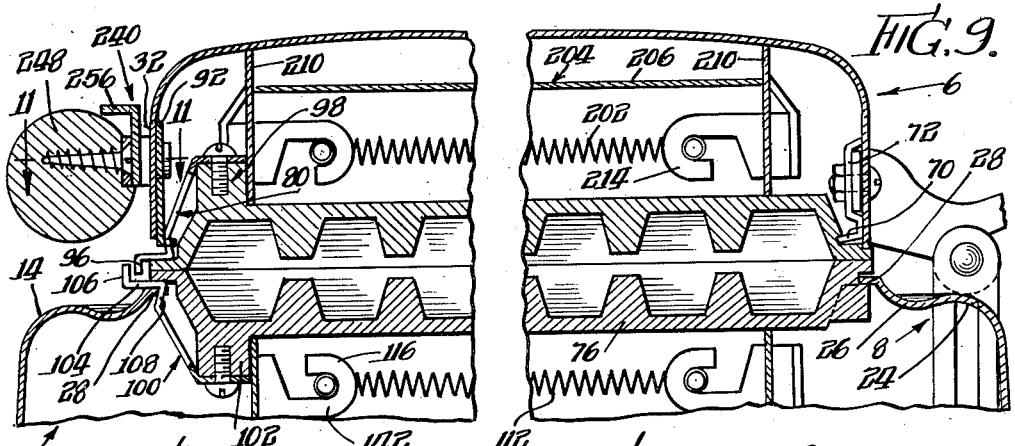
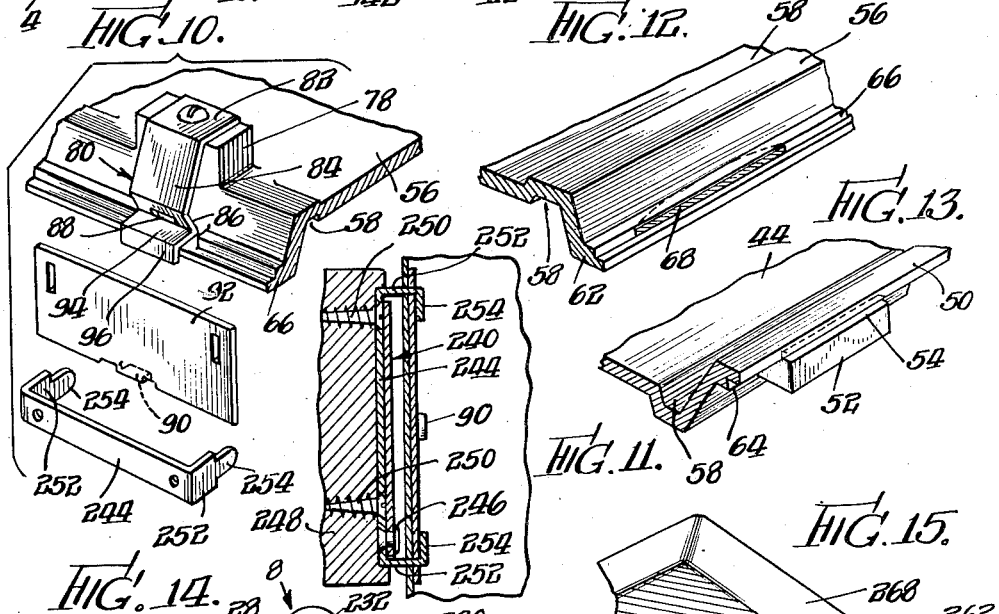
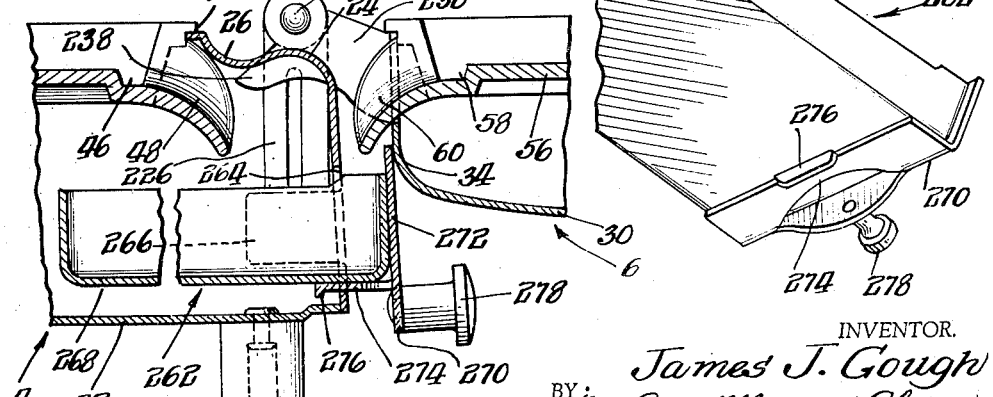
INVENTOR.
James J. Gough
BY Cox Moore & Olson
attys.

Patented Oct. 24, 1944

2,361,285

UNITED STATES PATENT OFFICE 2,361,285

ELECTRIC COOKING APPLIANCE

James J. Gough, Chicago, Ill., assignor to Chicago Electric Manufacturing Company, Chicago, Ill., a corporation of Illinois Application February 17, 1941, Serial No. 379,173

7 Claims. (Cl. 99—340)

This invention relates to an electric cooking appliance and more particularly to a combination electric grill and waffle iron.

It is an object of the invention to provide a combination electric grill and waffle iron which is relatively simple in construction, durable and comparatively inexpensive to manufacture.

Another object of the invention is to provide an electric cooking or baking appliance comprising thermostatic control means having improved and simplified adjusting means and mounting means resiliently pressing the thermostatic unit into engagement with the heated surface, grill or waffle plate to insure most advantageous transfer of heat between the heated surface, grill or waffle plate and the thermostatic unit.

A further object of the invention is to provide improved construction of means locking the grid, grill or waffle plate with the shell of the cooking appliance in firm and rigid relation while at the same time permitting ready detachment for the purpose of repair or replacement of the heat supplying or control elements within the shell and for permitting ready interchanging of heating members of different types as, for example, a grid or waffle plate.

Applicant's invention also contemplates the provision of improved means for mounting or supporting the sheet metal housings or pans carrying the heating elements.

It is a further object of applicant's invention to provide in an electric cooking or baking appliance such as a sandwich toaster, or a combined sandwich toaster and waffle iron, simplified but more durable hinge means of such construction that the upper section may be swung to an intermediate position to permit placing of the article of food or material on the lower section or may be swung to an extreme inverted horizontal position to permit use of the cooking appliance as a toaster or grill of two sections, the hinge means automatically retaining and supporting the upper seciton in either of said positions.

It is also an object of applicant's invention to provide hinge means of the above stated character utilizing the shell of the appliance adjacent the hinge means as abutments cooperating with the hinge means to hold the upper section in its intermediate and inverted positions.

A further most important object of applicant's invention is to provide in an electric cooking or baking appliance improved means for draining the grids of both sections in every position which these grids may assume to prevent the accumulation on the grids of excess grease or drippings from the articles being cooked or baked.

Applicant's invention further contemplates a construction wherein means such as a receptacle is shiftably mounted in the shell of the appliance to receive the drippings from the grids or heated plates of both sections in every relative position which these grids or plates may assume; wherein said receptacle is readily removable from the shell to discharge the collected drippings, and wherein means is provided for automatically so determining the position of said receptacle as to insure its proper location in respect to the upper section as the upper section is swung to or from its several positions.

Other and further objects and advantages of the invention will be apparent from the following description when taken in connection with the accompanying drawings, wherein:

Figure 1 is a view in perspective of an electric heating or cooking appliance embodying the invention;

Figure 2 is an enlarged view in vertical section taken substantially along the line 2—2 of Figure 1;

Figure 3 is a view in exploded perspective of a hinge means forming part of the invention;

Figure 4 is a fragmentary view in vertical section taken adjacent one of the hinge elements;

Figure 5 is a fragmentary end view in vertical section similar to Figure 4, but showing the sections of the appliance in a different relative position;

Figure 6 is a view in horizontal section taken substantially along the line 6—6 of Figure 2, but with certain parts broken away for the purposes of illustration;

Figure 7 is a fragmentary view in perspective illustrating the thermostat mounting and adjusting means forming part of the invention;

Figure 8 is a fragmentary view in vertical section taken substantially along the line 8—8 of Figure 6;

Figure 9 is a fragmentary enlarged view in vertical section generally similar to Figure 2, but illustrating waffle plates substituted for the grids shown in Figure 2;

Figure 10 is a view in exploded perspective of the parts of the handle mounting means and releasable parts interlocking the upper, heated member with the shell;

Figure 11 is a fragmentary view in a horizontal section taken substantially along the line 11—11 of Figure 9;

Figures 12 and 13 are fragmentary views in perspective of the heated members, grids or waffle plates and illustrate how the heated members, grids or waffle plates are formed along their rear edges to interlock with the shells;

Figure 14 is a fragmentary enlarged view in vertical section generally similar to Figure 2, but showing the sections and the drain receptacle in different positions; and Figure 15 is a fragmentary bottom view in perspective of the drain receptacle.

As shown in the drawings, an electric cooking appliance or combined grill and waffle iron comprises a base section 4 (Figure 1), an upper section 6, the upper section 6 being connected to the lower section by hinge means 8 and by a flexible electric cable 10, and the lower section being provided with terminal means 12 to receive a supply cord or cable.

The lower or base section 4 comprises a sheet metal shell 14 (Figures 1, 2 and 6), preferably stamped from a single piece of sheet metal to provide front and rear walls 16 and 18 and opposed side walls 20 and 22, integrally united at the corners of the shell and formed integrally with an upper, inwardly turned peripheral flange 24. The flange 24 is formed with a continuous upwardly facing concave groove 26 merging into a substantially horizontal, continuous bead or shelf 28.

The upper section 6 (Figures 1 and 2), comprises an inverted generally pan-shaped sheet metal shell 30 having a depending flange or skirt formed by integrally formed front and rear walls 32 and 34 and opposed end walls 36 and 38.

The lower shell 14 is supported on feet 40 of any suitable heat insulating material fastened in any convenient manner to a sheet metal bottom plate 42.

A shallow pan-shaped grid 44 is provided with a continuous surface groove 46 (Figures 2, 4, 6 and 14), inclined to the horizontal in opposite directions from a point substantially centrally of the forward edge of the pan downwardly to the opposite edges of the pan, then along the side edge of the pan downwardly toward the rear edge of the pan and then from the opposite side edges of the pan downwardly toward a substantially central portion of the rear edge of the pan.

Centrally of its rear edge and in communication with the groove 46, the pan 44 is provided with a downwardly curved lip or spout 48. The groove 46 provides a channel along which the grease or drippings may flow by gravity to the spout 48 through which they are discharged from the pan. The pan 44 is provided with a horizontal peripheral flange or bead 50 which engages or rests upon the peripheral upper edge, bead or flange 28 of the shell 14.

A pair of spaced blocks or lugs 52 (of which one only is shown in Figure 13), is formed on or secured to the pan 44 in spaced relation with the portion of the flange or bead 50 at the rear of the pan in a manner to provide openings or slots 54 to receive the portion of the flange or bead 28 extending along the rear of the shell 14.

The shell 30 of the upper section 6 receives a substantially pan-shaped grid 56 (Figures 2, 5, 10, 12 and 14) similar in structure to the pan-shaped grid 44 and similarly provided with a peripheral groove 58 conforming to the groove 46 and a discharge lip or spout 60 conforming to the lip or spout 48, the peripheral groove 58 permitting grease or drippings to flow by gravity into the spout 60 when the upper section is in the raised or inverted position shown in Figures 4, 5 and 14. The grid 56 is formed with a peripheral flange 62.

The peripheral flanges 50 and 62 of the grids 44 and 56 are formed to provide shoulders 64 and 66 inwardly of the edges of these flanges to engage the free edges of the shells 14 and 30. The portion of the shoulder 66 along the rear edge of the grid 56 is provided with spaced notches or grooves as 68 for receiving the lips of flanges 70 of clips or brackets 72 fastened to the rear wall flange 34 of the shell 30, as best illustrated in Figure 9 in connection with a waffle plate 74 which may be substituted for the grid 56.

A waffle plate 76 which may replace the grid 44, as illustrated in Figure 9, is provided along its rear edge similarly to the grid 44 with spaced lugs forming slots by which the plate is interlocked with the rear portion of the flange or bead 28 of the shell 14. The grids 44 and 56 and the waffle plates 74 and 76 are detachably interlocked at their forward edges with the shells 14 and 30.

As illustrated in Figure 10, the grid 56 is provided substantially centrally thereof with a lug 78 which may be formed integrally therewith or it may be secured thereto in any convenient manner.

A clip 80 of resilient sheet metal has a horizontal flange portion 82 fastened to the lug 78. A portion 84 connects the flange 82 to a substantially vertical portion 86 which has an opening 88 therein to receive a lug 90 projecting inwardly from a reenforcing plate 92 secured to the forward wall flange 32 of the shell 30.

The clip 80 is also provided with a forwardly turned flange 94 resting upon the peripheral flange 62 of the grid 54 and extending through an appropriate slot in the forward wall flange 32 of the shell 30. The flange 94 outwardly of the shell 30 is provided with a depending lip 96 providing a finger piece for operating the clip 80 inwardly to release it from the lug 90. As shown in Figure 9, the waffle plate 74 is also provided with a clip 80 fastened to a lug 98 similar to the lug 78.

The waffle plate 76 is provided with a clip 100 similar in construction to the clip 80 and similarly fastened to a lug 102 formed on or secured to the waffle plate 76 and depending therefrom. A forwardly projecting flange 104 which corresponds to the flange 94 of the clip 80 extends between the peripheral flange 50 of the waffle plate and the bead 28 and is of greater length than the corresponding flange 94 of the clip 80 so that the operating piece 106 projects outwardly a greater distance than the corresponding finger piece 96 of the clip 80 and hence there will be no interference between the clips when the upper and lower sections are in closed positions.

It should be understood, of course, that the grid 44 is provided with a clip identical in construction to the clip 100. A portion or arm 108 of the clip 100 is provided with an opening to receive a lug 110 (Figure 6) formed centrally of the forward portion of the bead or flange 28 of the shell 14 as by cutting spaced notches in this bead.

The heating unit for the lower section 4 comprises a heating element 112 formed from a coil of resistance wire mounted in a shallow box-like structure or pan-shaped shell 114 (Figures 2 and 6) by means of clips 116 and 118 of electrically insulating, preferably ceramic, material.

The box-like structure or pan 114 comprises sheet metal end pieces 120 and 122 and a sheet metal plate 124 forming the bottom of the box or pan and having opposed edge portions bent upwardly to form sides 126 and 128. The end pieces 120 and 122 are each formed with legs 130 and 132 at its opposite ends for supporting the box or pan 114 upon the bottom plate 42 of shell 14, the legs 130 and 132 having reduced, integral, depending lugs 134 and 136 passing through appropriate slots in the bottom plate 42 and twisted to retain the bottom plate and the box or pan 114 in assembled relation.

The end pieces 120 and 122 are also provided with integral laterally extending end flanges 138 having slots therein to receive depending lugs 140 (Figure 8), formed integrally with the side wall portions 20 and 22 of the shell 14 and depending from the peripheral bead or edge 28 of the shell. Beneath the flanges 138 the lugs 140 are bent over to retain the parts in assembled relation. By this construction the box or pan 114 of the heating unit reenforces and rigidifies the shell 14.

The mounting insulators or clips 116 and 118 each have, as best shown in Figures 2 and 6, an inner substantially J-shaped body portion 142 of reduced width passing through a slot in a side flange 126 or 128, or in the end piece 120 or 122, or in the bottom plate 124, and each clip has an enlarged outer portion 144 limiting inward movement of the clip.

The heating coil 112 is distributed through the box or pan 114 in such a way that it exerts on each of the mounting clips an inward force holding the enlarged portion of each clip against the outer surface of the box. At its opposite ends the coil 112 is secured to insulated, terminal screws 146 and 148 which receive one wire end of the interconnecting cable 10 and a wire from a control switch, hereinafter described.

A thermostat control device 150 (Figures 2, 6 and 7) comprises a sheet metal housing having a top wall 152, side walls 154 and an end wall 156 and lugs 158 depending from opposite corners of the housing and received in slots in the bottom plate 124 of the box or pan 114.

A strap 160 of spring metal, bowed as shown in Figure 7, is provided at its opposite ends with slots 162 receiving opposed lugs 158 at one side of the housing, the central upwardly bowed portion of the strap 160 engaging the bottom edge of the housing between a pair of the lugs 158 and accordingly resiliently urging the thermostat housing upwardly into engagement with the heated plate of the lower section 4. The clip 100 latches the heated plate against upward movement under the action of the spring 160. When the clip is released, the spring raises the heated plate and facilitates its removal from the lower shell.

The lugs 158 are twisted at the lower edges as at 164 to limit the upward movement of the thermostat under the action of the spring strap 160. A leaf spring switch blade 166 is mounted on a side wall 154 of the housing and insulated therefrom by bolts 168 and insulating block 170. A bi-metallic switch blade 172 is mounted on the same side wall 154 by the bolts 168 and insulated from the switch blade 166 and the bolts 168 as by insulating blocks 174.

A lug 176 is secured to or formed on the same side wall 154, and beyond the switch blade 166 projects toward the bi-metallic switch blade 172 to engage an insulating button 178 affixed to the blade 172 so as to limit the movement of this thermostatic blade in the direction of the blade 166.

Means is provided for adjusting the position of the switch blade 166 to control the circuit to the heating units and to determine the temperature at which the heating units will be cut out by the operation of the thermostatic blade 172.

This means comprises a shaft or tube 180 threaded at its inner end into an internally threaded bushing 182 fastened in any convenient manner to the forward side wall 154 of the thermostat housing, the shaft being supported adjacent its opposite end in the forward side wall 126 of the box or pan 114 of the heating unit, and the wall 126 being provided for this purpose with an opening through which the shaft 180 passes as shown in Figure 2.

Contact between the heating coil 112 and the shaft or tube 180 is prevented by means of insulating bushings 184 and 186, the bushings having concave annular grooves receiving the heating coil. Bushing 184 resting upon the surface of the bottom plate 124 offers additional support for the shaft or tube 180.

A non-conducting lug or pin 188 is set into the inner end of the shaft or tube 180 and serves to engage the switch blade 166. At its outer end the shaft or tube 180 carries a crank 190 having a crank pin 192 received in a slot 194 of an operating link or crank 196 secured to the shank or pin portion 198 of an operating knob 200. The knob 200 has a conventional pointer portion for cooperation with suitable indicia inscribed on the forward wall 16 of the shell 14 of the lower heating section 4.

It will be evident that as the knob is rotated the shaft or tube 180 is angularly adjusted and is thereupon moved axially because of its threaded engagement with the stationary bushing 182. As the knob 200 is rotated the switch blade 166 is moved toward and from the thermostatic switch blade 172 to either break contact between these switch blades, as shown in Figure 6, or to cause the contact carried by the blade 166 to engage the contact carried by the thermostatic blade 172 and simultaneously to deflect the thermostatic blade 172 varying amounts, thus to predetermine the temperature at which the contact carried by the thermostatic blade 172 upon heating of the blade will move out of engagement with the contact carried by the blade 166.

The heating unit for the upper section 6 comprises a heating element 202 (Figure 2), formed of a coil of resistance wire mounted in a box-like structure or pan-shaped shell 204 generally similar to the box-like structure or pan 114. In the case of the box-like structure or pan 204 the sheet metal bottom plate 206 is bent downwardly at its opposite ends to form end walls 208 of which one only is shown in the drawings. Side walls of the box-like structure are formed by sheet metal side pieces 210 of greater length than the bottom plate 206 and of a greater height than the end walls 208, the side pieces 210 being of such length as to frictionally interfit with the shell of the upper section and be firmly held therein by the resiliency of the abutting end walls 36 and 38 of the shell 30.

The side pieces 210 are of such a height as to abut the inner surface of the grid 56 or the waffle plate 74 to thereby support the grid or waffle plate when the upper section is in its inverted position, and to be supported by the grid or waffle plate when the upper section is in its normal closed position as shown in Figure 2.

The bottom plate 206 is provided adjacent its forward edge and midway of its end walls 208 with an opening (not shown) aligned with a transparent member or lens 212 (Figure 1), mounted in an opening in the top wall of the shell 30 of the upper section, so that through this transparent member 212 a portion of the heating coil 202 may be viewed to determine when the heating element has reached the proper operating temperature.

The heating coil 202 is mounted in the box-like structure or pan 204 by means of insulating brackets or clips 214 in the same manner as the coil 112 is mounted in the pan 114 by the clips 116 and 118.

The hinge means 8 mounting the upper section upon the lower section 4 consists of a pair of units, each of which comprises a sheet metal bracket 216 (Figures 2 to 5) fastened to the rear flange or side wall portion 18 of the lower shell 14 as by welding or by bolts 218. The bracket is formed to provide an arm or lug 220 extending substantially parallel to the wall 18 and spaced therefrom as by the shelf portion 222 of the bracket.

The lug 220 is of a length somewhat greater than the shelf portion 222 of the bracket and is received in a slot 224 of a sheet metal link 226. The link 226 passes upwardly through a slot 228 formed in the peripheral flange 24 at the rear of the shell 14 and is pivoted to a bracket 230 as by means of a pin or rivet 232.

The bracket 230 is formed of sheet metal and is formed with a reduced lug 234 passing through a slot in the rear wall portion 34 of the upper shell and bent over against the shell for reception within the body portion of the mounting clip 72, the clip 72 and the lug 234 being fastened to the shell as by a common bolt 236.

The bracket 230 is formed with a lug or nose 238 projecting beyond the pivot pin 232 so as to engage the wall flange 18 of the shell 14 when the upper section 6 is in a position substantially at right angles to the lower section, as shown in Figure 4, and to pass through the slot 228 into engagement with the under surface of the part of the peripheral flange 24 which forms the groove 26 when the upper section is in its fully inverted position, as shown in Figures 5 and 14.

It will thus be evident that the lugs or nose pieces 238 of the pair of hinge units provide automatic means for limiting the swinging movement of the upper section relative to the lower section so as to position the upper section at an angle slightly greater than 90 degrees relative to the lower section as shown in Figure 4; and for maintaining the upper section in this relative position until a slight upward movement is imparted to the upper section; for limiting the movement of the upper section as it is swung to its fully inverted position and for supporting the upper section when in this fully inverted position, as shown in Figures 5 and 14.

Additional support for the upper section when it is in a fully inverted position is provided by auxiliary supporting means 240 (Figures 1, 2, 5, 9 and 11), which comprises a sheet metal plate forming a leg 242, pivoted to a handle supporting, generally U-shaped, sheet metal strap 244 (see also Figure 10) by means of a rivet or the like 246.

The handle 248 may be of a desired configuration, preferably cylindrical, and provided with a slot for receiving the mounting strap 244 to which the handle is fastened by the screws 250, the heads of which are received in countersunk openings in the strap 244 so that the auxiliary supporting leg 242 may when not in use lie flush with the inner surface of the strap 244.

The opposed laterally bent leg portions of the strap 244 are formed with enlarged portions 252 spacing the handle receiving portion of the strap from the forward wall 32 of the upper shell so that the auxiliary supporting leg 242 may be received between the handle and the shell and be substantially concealed by the handle when not in use. These opposed leg portions of the strap are additionally provided with reduced lugs 254 passing through appropriate slots in the forward wall 32 of the upper shell and through slots in the plate 92 and being bent over against the inner surfaces of this plate to fasten the strap and the plate 92 to the shell.

The auxiliary supporting plate or leg 242 is provided with a laterally extending forwardly bent flange 256 adapted to overlie the inner edge of the handle 248 when in collapsed position and to provide a finger piece for swinging the auxiliary supporting plate about the pivot screw 246 from the collapsed position shown in Figures 1, 2 and 9, to the extended position shown in Figure 5, wherein it provides a support for the forward edge of the upper section.

Handles for carrying the grill or waffle iron are provided by means of blocks 258 (Figures 1 and 6), preferably cylindrical, secured to the side walls 20 and 22 of the lower shell 14 as by screws (not shown) and spacing sleeves or bushings 260.

A drawer or pan 262 (Figures 2, 6, 14 and 15) is slidably mounted in the lower shell 14, the rear wall portion 18 of the lower shell 14 being provided with an opening 264 for receiving the drawer or pan and being provided with flanges 266 extending inwardly from the opposite vertical edges of the opening 264 to engage and guide the drawer or pan 262. The drawer or pan 262 comprises a sheet metal box 268 having a sheet metal plate 270 welded or otherwise fastened to the front of the box, the plate 270 providing a forward wall 272 of greater height than the front of the box and of greater height than the opening 264 so as to engage the wall 18 of the lower shell and limit the inward movement of the drawer.

The plate 270 is also formed with a lateral flange 274 extending beneath the box 268 and provided centrally at its rear, free edge with a depending lug 276 adapted to engage the wall portion 18 of the shell and limit the outward movement of the drawer. A knob 278 may be riveted or otherwise fastened to the wall portion 272 beneath the flange 274.

The drawer or pan 262 is disposed substantially centrally of the rear wall portion 18 of the lower shell and beneath the discharge lip or spout 48 of the lower grid 44 so as to receive the grease or other waste material drained from the lower grid through the spout 48. The opening 264 is of sufficient height to clear the lug 276 when the drawer is lifted slightly for removal from the lower shell.

The lug 276 is so positioned with relation to the front wall portion 272 of the drawer that when the lug engages the rear wall 18 of the lower shell the wall portion 272 of the drawer is positioned to clear the drain spout 60 of the upper grid 56 as the upper section is moved to its inverted position, and at the same time is positioned to engage the rear wall 34 of the upper section so that after the spout 60 has cleared the front 272 of the drawer the upper section engages the front of the drawer and moves the drawer inwardly to the position shown in Figure 14 in which it is properly positioned to receive the grease or other waste matter drained from the upper grid 56 through the spout 60.

If the lug 276 were positioned to engage the rear wall 18 of the lower shell when the upper and lower sections are positioned as shown in Figure 14, then the spout 60 would not be able to clear the front wall 272 of the drawer as the upper section was swung to or from its inverted position.

On the other hand, if the lug 276 were positioned further from the front of the drawer or were not provided at all, then the drawer would not be automatically positioned for proper engagement with the rear wall 34 of the upper shell and it might be engaged by the top wall 30 of the upper shell and be twisted or broken by the upper shell as the upper shell was moved to its inverted position, or the upper shell scratched and broken by the drawer as the upper shell was moved to this inverted position.

Hence, the lug 276 insures the automatic positioning of the drain pan or drawer in proper position to clear the spout 60 on the upper grid and to engage the rear wall 34 of the upper shell and be thereby moved inwardly to the precise and proper position in relation to the spout of the upper shell when the upper section is in its inverted position.

The lug 276 has an additional purpose which is to insure the positioning of the drain pan or drawer in the proper position to receive the drippings from the spout 60 as the upper section is swung to or from the position substantially at right angles to the lower section from or to the inverted position.

Thus, when the lug 276 engages the wall 218 of the lower section the portion of the drawer lying outside of the wall 18 projects beneath the spout 60 when the upper section is in the position substantially at right angles to the lower section and thus drippings from the spout 60 will be received in the drawer.

As the upper section is swung from the inverted position shown in Figure 14, to the position substantially at right angles to the lower section, as shown in Figure 4, the lower edge of the spout 60 will engage the upper edge of the front wall 272 of the drawer or pan and move the drawer outwardly until the lower edge of the spout clears the upper edge of the front wall 272.

The drawer thus moves outwardly with the lower edge of the spout 60 as the upper section is swung upwardly from its inverted position and matter dripping from spout 60 will therefore always fall within the drawer or pan 262.

The terminal means or prongs 12 are insulatingly mounted in the conventional manner upon a bracket 280 (Figure 6), having lug portions abutting the inner surface of the shell 14 and fastened at one corner of the shell 14 in any convenient manner, as by welding or by bolts 282.

A wire 284 connects one of the terminal prongs to the switch blade 166 of the thermostatic unit 150 and the other terminal prong is connected to one of the wires of the cable 10. A wire 286 connects the thermostatic switch blade 172 to the terminal screw 148 for the heating coil 112 of the lower heating unit.

Thus, the heating coils 112 and 202 are connected in series with each other and with the switch blades of the thermostatic unit so that both coils are controlled by the thermostatic unit.

It will be seen from the foregoing description that applicant has provided a combination electric grill and waffle iron which is relatively simple in construction, durable and comparatively inexpensive to manufacture.

Applicant has further provided an electric cooking or baking appliance comprising thermostatic control means having improved and simplified adjusting means and mounting means resiliently pressing the thermostatic unit into engagement with the heated surface, grill or waffle plate to insure most advantageous transfer of heat between the heated surface, grill or waffle plate and the thermostatic unit.

The invention further provides an improved construction locking the grid, grill or waffle plate with the shell of the cooking appliance in firm and rigid relation while at the same time permitting ready detachment for the purpose of repair or replacement of the heat supplying and control elements and for permitting ready interchanging of heating members of different types as, for example, a grid or waffle plate.

Applicant's invention has also provided an improved means for mounting or supporting the sheet metal housings or pans carrying the heating element.

The invention has further provided in an electric cooking or baking appliance such as a sandwich toaster or a combined sandwich toaster and waffle iron simplified but more durable hinge means of such construction that the upper section may be swung to an intermediate position to permit placing of the article of food or material on the lower section or may be swung to an extreme inverted horizontal position to permit use of the cooking appliance as a toaster or grill of two sections, the hinge means automatically retaining and supporting the upper section in either of said positions.

The invention has also provided hinge means of the above stated character utilizing the shell of the appliance adjacent the hinge means as abutments cooperating with the hinge means to hold the upper section in its intermediate and inverted positions.

The invention has also provided in an electric cooking or baking appliance improved means for draining the grids of both sections in every position which these grids may assume to prevent the accumulation on the grids of excess cooking grease or drippings from the articles being cooked or baked.

Applicant has further provided a construction wherein means such as a receptacle is shiftably mounted in the shell of the appliance to receive the drippings from the grids or heated plates of both sections in every relative position which these grids or plates may assume; wherein said receptacle is readily removable from the shell to discharge the collected matter, and wherein means is provided for automatically so determining the position of said receptacle as to insure its proper location in respect to the upper section as the upper section is swung to or from its several positions.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In an electric cooking appliance, a sheet metal shell having an opening in its top wall, a cooking plate mounted on said shell to extend below the plane of the top wall and close the opening in said top wall of said shell, said plate being formed with means to drain waste matter from the surface of the plate and direct such matter downwardly within the shell, a receptacle shiftably and removably mounted on and within the shell beneath said drain means to receive the drippings from the plate.

2. In an electric cooking appliance, upper and lower heating sections hingedly connected for swinging movement of the upper section from a first position over the lower section to a second position substantially at right angles to the lower section, and to a third, substantially inverted position, said upper and lower sections comprising pan-shaped shells, cooling plates forming walls of said shells in abutting relation when the upper section is in the first position, said plates being formed with portions draining matter from the surfaces of the plates, a receptacle shiftably mounted in the shell of the lower section to receive drippings from the drain portion of the plate in the shell of the lower section and shiftable outwardly from said shell of the lower section, movement limiting means acting upon outward movement of the receptacle to position the receptacle to receive drippings from the drain portion of the plate in the shell of the upper section when the upper section is in the second position, and means for causing inward movement of the receptacle as the upper section is moved to the third, inverted position to automatically position the receptacle to receive the drippings from the drain portion of the plate in the shell of the upper section when said section is in this third position.

3. In an electric cooking appliance, a sheet metal shell, a cooking plate forming one wall portion of said shell, said plate having a drain spout projecting downwardly from the plate wholly within the shell, and a receptacle shiftably mounted on and extending within said shell and positioned beneath said spout to receive the drain drippings from said spout.

4. In an electric cooking appliance, upper and lower heating sections hingedly connected for swinging movement of the upper section from a first position over the lower section to a second position substantially at right angles to the lower section, said sections comprising shells, cooking plates forming walls of said shells in abutting relation when the upper section is in the first position, said plates being formed with portions draining matter from the surfaces of the plates, a receptacle shiftably mounted on and extending within the shell of the lower section to receive drippings from the drain portion of the plate in the shell of the lower section and shiftable outwardly from said shell of the lower section, and movement limiting means acting upon the outward movement of the receptacle to position the receptacle to receive drippings from the drain portion of the plate in the shell of the upper section when the upper section is in the second position.

5. In an electric heating appliance, upper and lower hingedly connected heating sections, each section comprising a sheet metal shell having a heat applying plate mounted therein, means to retain the upper section in a position at substantially right angles to the lower section and adapted upon lifting of the upper section to permit swinging of the upper section to a substantially inverted position, a drain spout on the plate associated with the upper shell and a shiftably mounted receptacle within the shell of the lower section for receiving drainage from said spout, said receptacle and the shell of the lower section being provided with interengageable abutment means indicating the proper position of the receptacle to receive the drainage from said drain spout when the upper section is in the position substantially at right angles to the lower section, said receptacle being constructed to be engaged by the shell of the upper section and shifted thereby inwardly of the shell of the lower section as the upper section is moved to the inverted position whereby said receptacle is automatically located in a proper position to receive the drainage from said drain spout when the upper section is in the inverted position.

6. In an electric cooking appliance, a sheet metal outer shell, a pan-shaped sheet metal inner shell mounted within the first shell and having a wall spaced from the corresponding wall of the outer shell, said inner shell having laterally directed, slotted flanges, the outer shell having integral lugs received in the slots of the flanges of the inner shell, a heating element in the inner shell, a cooking plate forming the top wall of both shells and having a drain spout projecting from the margin thereof beyond the inner shell and downwardly between the spaced walls of said shells, and a receptacle shiftably and removably mounted on and extending within the outer shell and adapted for location beneath said spout to receive drippings from the plate.

7. In an electric heating appliance, upper and lower hingedly connected heating sections movable from a position where the upper section covers the lower section to and from a position in which the upper section is substantially at right angles to the lower section and to and from a position in which the upper section is substantially inverted, each section comprising a sheet metal shell having a heat applying plate mounted therein, said heat applying plates having drain spouts for discharging waste matter from the plates, a receptacle shiftably mounted in the shell of the lower section for receiving drainage from the spout of the plate of the lower section, said receptacle and the shell of the lower section being provided with interengaging abutment means indicating the proper position of the receptacle to receive the drainage from the drain spout of the plate of the upper section when the upper section is in a position substantially at right angles to the lower section, said receptacle having a portion adapted to be engaged by the shell of the upper section as the upper section is moved toward the inverted position whereby to shift the receptacle inwardly into a proper position to receive drainage from the drain spout when the upper section is in the inverted position, and said receptacle having a portion to be engaged by the drain spout of the plate of the upper section as the upper section is moved from the inverted position toward the position substantially at right angles to the lower section whereby to shift the receptacle outwardly into the proper position indicated by the abutment means to locate the receptacle in proper position to receive the drainage from the drain spout when the upper section is returned to said position substantially at right angles to the lower section.

JAMES J. GOUGH.

CERTIFICATE OF CORRECTION.

Patent No. 2,361,285. October 24, 1944.

JAMES J. GOUGH.

It is hereby certified that error appears in the printed specification of the above numbered patent requiring correction as follows: Page 1, first column, line 44, for "seciton" read --section--; page 6, first column, line 12, for "cooling" read --cooking--; and that the said Letters Patent should be read with this correction therein that the same may conform to the record of the case in the Patent Office.

Signed and sealed this 10th day of April, A. D. 1945.

Leslie Frazer (Seal)                  Acting Commissioner of Patents.